June 8, 1943.  G. OPENSHAW  2,321,101
DOWEL PIN EMPLOYED IN JOINING WOODEN MEMBERS
Filed July 6, 1938
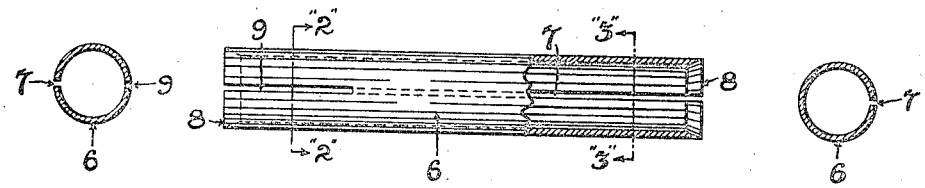
Fig: 2.   Fig: 1.   Fig: 3.
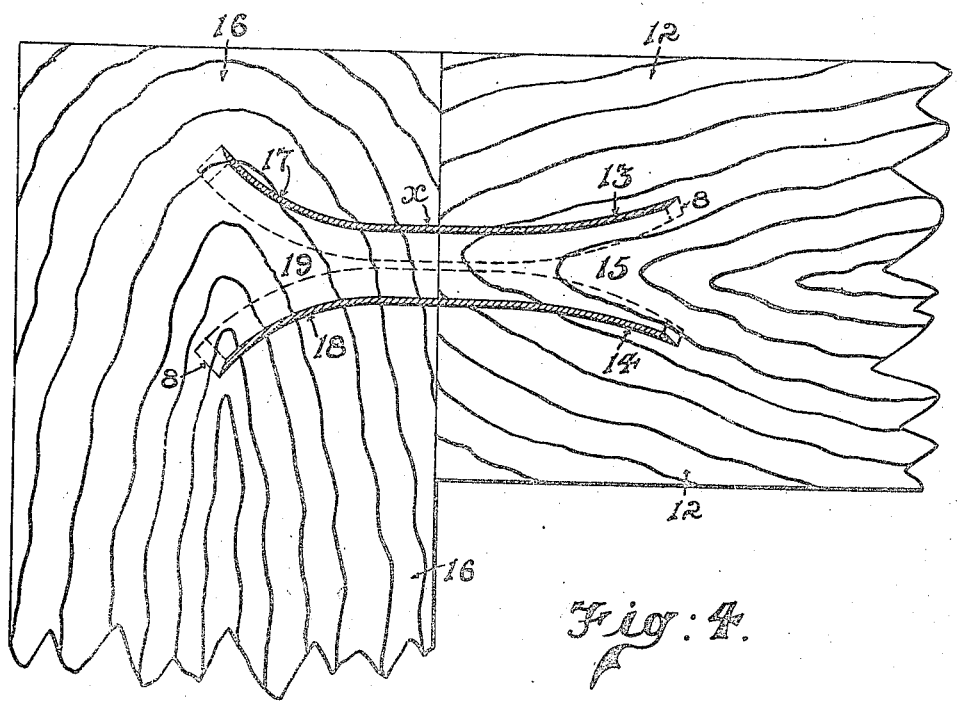
Fig: 4.
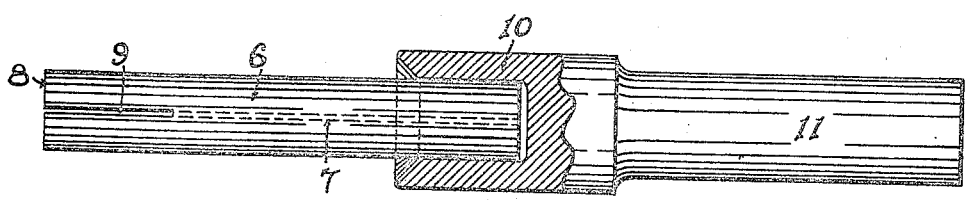
Fig: 5.
Inventor:-
Gerald Openshaw
By His Attorney:-

Patented June 8, 1943

2,321,101

UNITED STATES PATENT OFFICE 2,321,101

DOWEL PIN EMPLOYED IN JOINING WOODEN MEMBERS

Gerald Openshaw, Ashton-on-Mersey, England

Application July 6, 1938, Serial No. 217,749
In Great Britain January 8, 1938

4 Claims. (Cl. 85—11)

In the manufacture of wood furniture generally and in other arts, for example in the making of wood patterns for use in metal casting, dowel joints are usually formed by boring registering holes in parts to be joined and employing a wooden pin as dowel pin, this pin engaging in both holes and being secured therein by means of glue.

It is the object of the present invention to provide a form of dowel pin which will not call for any boring of the parts to be joined, or the use of glue, and which dowel is of such a nature that it will be impossible to withdraw the same from its operative position without breaking away of the surrounding wood.

To attain this a dowel pin according to this invention is formed of metal with separable transversely curved limbs so formed that as the dowel pin is pressed into position in the wood, they will diverge, the pin thus expanding. A very effective grip is thus simply attained by the mere pressing of the dowel pin into position, and this for two reasons. Firstly, the divergence of the limbs gives a positive grip between the exterior of these limbs and the surrounding wood fibre; and secondly, due to the transverse curvature of the limbs of the dowel pin and the consequent flattening of the arc a frusto-conical core of wood, the fibres of which are put into a high state of compression, with consequent increase of frictional grip upon the interior faces of the limbs, is formed between the latter as they are pressed into the wood. Withdrawal of the dowel pin by any withdrawing force, applied necessarily longitudinally of the dowel pin, is thus rendered impossible.

The most convenient industrial method of forming a dowel pin of the nature described is to form a metal tube of appropriate dimensions with a longitudinal slit or longitudinal slits in the same at appropriate points, the tube being formed with sharp edges. This simple form is found to be effective and it is, further, most economical in production.

The invention in the form just set forth, viz: that of a prepared metal tubular member, will now be described, reference being had to the annexed drawing wherein:

Figure 1 is an elevation, partly in section, of a dowel pin of circular cross-section, ready for use;

Figure 2 is a cross section taken on line 2—2 of Figure 1; Figure 3 being a cross section taken on line 3—3 of the said Figure 1;

Figure 4 is a vertical cross section of the dowel pin in use and serving to secure two wooden members together, and Figure 5 shows in part sectional elevation a form of presser holder device which may be used for the purpose of pressing a dowel pin into position.

Referring to Figures 1, 2, and 3, a metal tube 6 is formed in any manner and of required dimensions as to length, diameter, and thickness of metal. Known forms of drawn metal tubes may be employed, cut into the required lengths. In the manner known in metal working there is formed in the tube 6 the slit 7. The ends of the so formed dowel pin are then countersunk or reamered out as shown, with the formation of sharp entering edges 8. This for some purposes completes the dowel pin, but in the example illustrated a further slit 9 is formed in the tube 6 at an opposite end of a diameter to the first, this second slit extending from one edge to a desired distance towards the median diametral line of the tube.

In employing a dowel pin so formed for the purpose of securing two wood members together —see Figure 4—the dowel pin 6 is fitted within a presser holder or clamp formed as seen at 10 in Figure 5, this holder having the shank 11 by which it is fitted into a movable clamping member having a suitable handle or like operating device, as known in connection with clamps employed by woodworkers. Assuming that the dowel pin is first to be pressed into the wood member 12, that is to say "with the grain" the said wood member is suitably positioned and held and the dowel pin pressed therein. As in this case the dowel pin enters with the grain it is found by practice that it is sufficient to insert that portion of the said dowel pin which is provided with only one longitudinal slit therein. This slit 7 widens as the dowel pin enters until at the completion of pressing the limbs 13 and 14 have diverged as seen in the drawing, giving the secure hold desired, with the core of wood 15 between them. The other portion of the dowel pin, now projecting, is pressed into position in the wood member 16 by suitably holding both members 12 and 16 and clamping the latter into position upon the dowel pin. The member 16 is shown as receiving the said dowel pin "against the grain," and it is found that the added longitudinal slit 9 is useful as assisting in the correct degree of divergence of the limbs 17 and 18. A substantially frusto-conical core of wood 19 is formed, as in the other wood member 12.

In both cases the transversely curved formation of the limbs of the dowel pin with the formation of the cores 15 and 19, and the high compression of the wood fibres of such cores due to the pressing into position of the dowel pin, give the desired grip. The tubular form of said pin at the point indicated by *x* gives, further, a high degree of transverse resistance, that is to say, resistance to any force which might tend to impart relative movement to the wood members 12 and 16 in a direction transversely of such pin.

I do not confine myself to the precise form of dowel pin shown and described above. The transversely curved limbs may be formed in any manner, and further where thought desirable both halves of the dowel pin as shown may be formed with opposed longitudinal slits of desired length. Again, the pin itself may be of rectangular section, duly slitted to form the limbs, and the form of limbs so produced are deemed to be included in this description and in the appended claims in the expression "transversely curved."

I claim:

1. A dowel pin comprising an elongated metal member having a tubular end portion adapted to be driven into a wooden part to be joined to another without boring said part, said end portion being hollow throughout its driving length and having its outer extremity internally beveled to provide an entering edge which will lead the hollow end to expand upon driving the pin, one or more narrow longitudinal slits in the wall of said pin extending from said beveled entering edge toward the opposite end of the pin, the slits being widely spaced peripherally of the wall of said tubular end, whereby one or more wide arcuate portions of said wall are formed which when the pin is driven spread apart and expand transversely of the pin so as to increase their radius of curvature and enclose a substantially frusto-conical core of wood, said portions being of sufficient arcuate extent as to afford substantial resistance to expansion and spreading on being driven, so that said resistance alone applies a substantial compression to said frusto-conical core of wood and thus effects a firm embedment of the pin.

2. A dowel pin according to claim 1 in which two diametrically opposite narrow slits are made, providing two substantially semi-circular spreading wall portions.

3. A dowel pin comprising an elongated metal member having a tubular end portion adapted to be driven into a wooden part to be joined to another wtihout boring said part, said end portion being internally beveled to provide an entering edge which will lead the hollow end to expand upon driving the pin, a single narrow longitudinal slit in the wall of said pin extending from said beveled entering edge toward the opposite end of the pin, whereby under the influence of said beveled leading edges the tubular end portion flares radially outwardly, and also circumferentially in opposite directions from the slit, and encloses a substantially frusto-conical core of wood, which due to the resistance of the tubular end to expansion is subjected to a substantial compression and thus effects a firm embedment of the pin.

4. A dowel pin comprising an elongated tubular metal member adapted to be forced into wooden parts which are to be joined without boring, said member being hollow throughout its length and having its opposite circular extremities bevelled to provide entering edges which will lead the hollow end to expand upon forcing the pin into the wood, one or more narrow longitudinal slits in the wall of said pin extending from each of said bevelled edges toward the respective opposite ends of the pin but terminating short thereof, the slits being widely spaced peripherally of the wall of said tubular member, whereby at each end of said pin one or more wide arcuate portions of said wall are formed which when the pin is driven spread apart and expand transversely of the pin so as to increase their radius of curvature and enclose a substantially frusto-conical core of wood, said portions being of sufficient arcuate extent as to afford substantial resistance to spreading and expansion on being driven, so that said resistance alone applies a substantial compression to said frusto-conical core of wood and thus effects a firm embedment of the pin.

GERALD OPENSHAW.